United States Patent [19]
Touro

[11] 3,961,908
[45] June 8, 1976

[54] AUTOCLAVE SYSTEM FOR LEACHING SULFIDE CONCENTRATES

[75] Inventor: Freddie J. Touro, New Orleans, La.

[73] Assignee: Freeport Minerals Company, New York, N.Y.

[22] Filed: Feb. 27, 1974

[21] Appl. No.: 446,412

[52] U.S. Cl. ................................. 23/290; 423/35
[51] Int. Cl.[2] ..................... B01J 3/04; C01G 3/02; C22B 15/00
[58] Field of Search .......... 23/290, 263, 286, 267 R, 23/267 A, 267 B, 267 C, 267 D, 267 E, 267 F, 267 MS, 267 S, 269, 270 R, 270 B, 270.5 R, 270.5 T, 270.5 W, 271 P, 271 G, 271 MS, 260; 75/101, 117, 119; 423/150, 27; 210/15, 63, 201, 218; 266/12; 202/158; 203/DIG. 6

[56] References Cited
UNITED STATES PATENTS

| | | | |
|---|---|---|---|
| 2,081,322 | 5/1937 | Carney............................ | 203/DIG. 6 |
| 2,718,455 | 8/1955 | McCormick, Jr.................... | 423/141 |
| 2,864,692 | 12/1958 | Mancke et al..................... | 423/37 X |
| 2,871,116 | 1/1959 | Clark.............................. | 423/145 X |
| 3,088,974 | 5/1963 | Cier................................ | 23/290 X |
| 3,615,364 | 10/1971 | Rubak.............................. | 75/117 X |
| 3,733,264 | 5/1973 | Spector et al.................... | 210/15 X |
| 3,785,430 | 1/1974 | Pfeiffer et al.................. | 23/260 UX |

FOREIGN PATENTS OR APPLICATIONS
1,091,568   10/1960   Germany

*Primary Examiner*—Joseph Scovronek
*Attorney, Agent, or Firm*—Ronald A. Schapira

[57] ABSTRACT

A method and apparatus for high temperature-high pressure acid leaching of sulfide ores is described. The apparatus includes an autoclave having a plurality of pressurized compartments and a water removing-heat removing condenser. Means are described for the introduction of a neutralizing agent directly into the autoclave in order to maintain the acidity of the slurry at a level where substantially all of the iron present in the slurry will form an insoluble iron oxide precipitate. Means are described for removing the gaseous products resulting from the introduction of the neutralizing agent while avoiding contamination thereby of a substantial portion of the oxygen.

9 Claims, 1 Drawing Figure

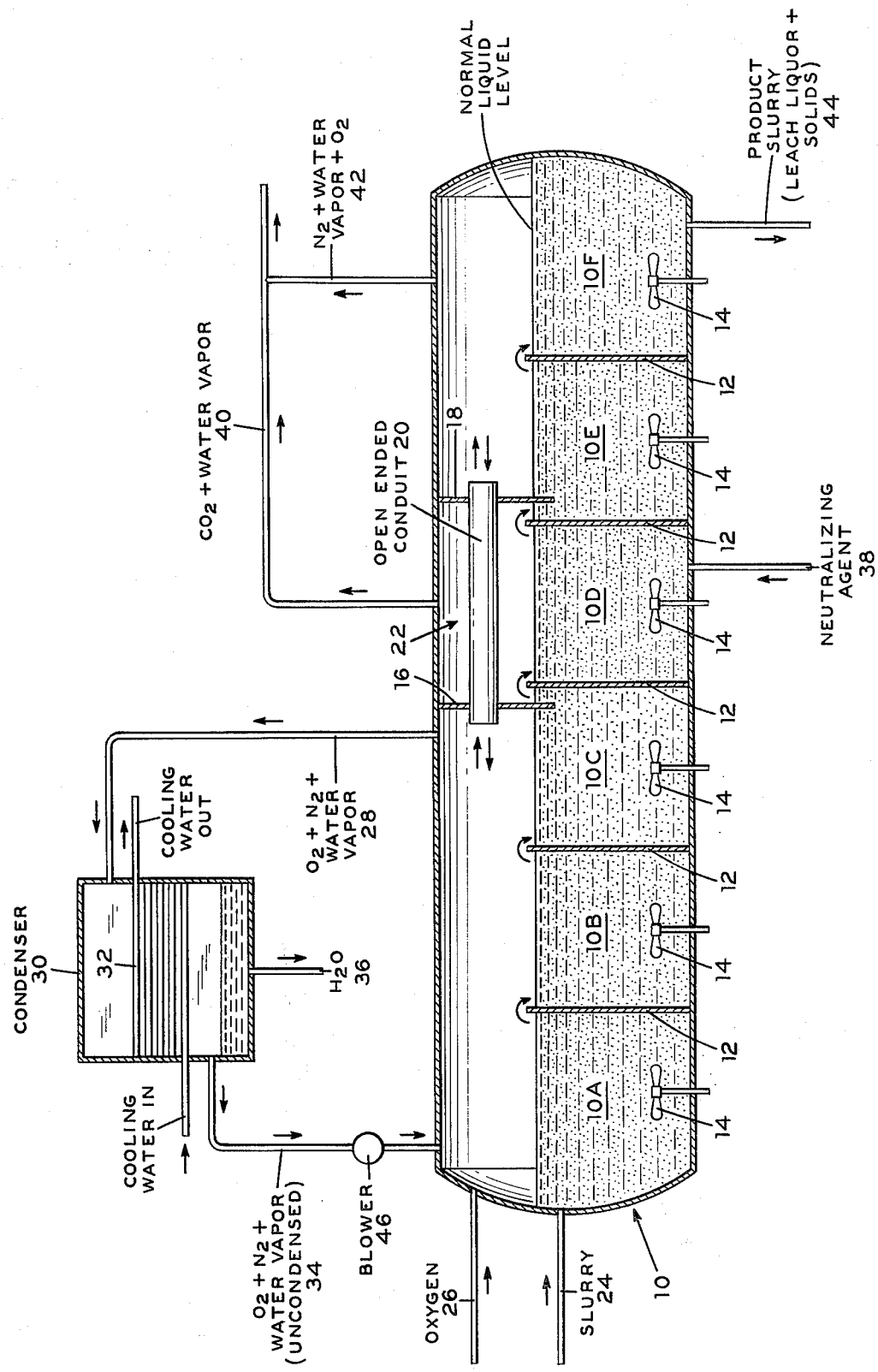

AUTOCLAVE SYSTEM FOR LEACHING SULFIDE CONCENTRATES

BACKGROUND OF THE INVENTION

This invention relates to the recovery of non-ferrous metals from sulfide ores containing nickel, cobalt, copper and other nonferrous metals, and more particularly, it relates to the recovery of these metals from sulfide ore concentrates by the acidic leaching of these concentrates in the presence of oxygen at high temperatures and pressures. Specifically, this invention relates to the oxidative leaching of iron-containing sulfide ores, such as chalcopyrites, at high temperatures and pressures wherein neutralizing agents are employed to neutralize at least a portion of the free acid present in the concentrate slurry being processed.

In existing autoclave processes for the high temperature-high pressure treatment of sulfide ore concentrates for the recovery of metal values by oxidative leaching it is often desirable to neutralize a portion of the acidity produced as a result of the reactions that take place in the process. Normally, alkaline-earth metal neutralizing agents, such as lime or limestone, are used for this purpose. In some instances this neutralization is carried out after the oxidation-leaching step in a vessel separate from that of the main oxidation-leaching reaction. In other instances the slurry is removed from the autoclave, neutralized with the lime or limestone, and then returned to the autoclave for further processing. Alternatively, the neutralizing agent may be added directly to the leaching vessel. The neutralization of oxidized sulfide slurries with lime or limestone is described in U.S. Pat. Nos. 2,686,114 and 2,718,455.

Because of cost considerations, limestone is usually the preferred neutralizing agent. When limestone is used, however, carbon dioxide is produced which tends to dilute the gases that are used for oxidation. In order to prevent a buildup of $CO_2$ in the system the $CO_2$ must be bled off. Since the $CO_2$ is distributed throughout the vapor space of the autoclave system, this bleeding is accompanied by losses of valuable oxygen. Likewise, it is usually necessary in these processes to control the prescribed operating temperatures, which, as a result of the exothermic nature of the oxidation reactions, tend to rise quite rapidly. In order to do this it then becomes necessary to remove heat from the system. This is commonly done by venting the vapors to the atmosphere with the consequent loss of the oxygen present in the vapors. Still in other instances the slurry is removed from the autoclave, cooled in a separate operation, and then returned to the autoclave system. Such methods are for the most part inefficient and wasteful and are not without a number of disadvantages.

It is the object of this invention to provide an autoclave system for the effective oxidation-leaching of sulfide ore concentrates without the disadvantages associated with conventional autoclave systems which have been used heretofore for the treatment of these concentrates.

BRIEF SUMMARY OF THE INVENTION

The autoclave system of this invention involves a horizontal, cylindrical pressure vessel fitted internally with baffles forming a plurality of compartments. One compartment is provided with two auxiliary baffles, the lower edges of which are submerged beneath the normal liquid level so that the vapor space above the liquid level of this compartment is isolated from the vapor space above the liquid in the other compartments. An open-ended conduit connects the common vapor spaces of the other compartments.

Means are provided for continuously feeding a sulfide ore slurry into the autoclave. An oxygen-containing gas is continuously fed into the autoclave to react with the slurry and form a solution of nonferrous sulfates.

Means are provided for introducing a neutralizing agent into the compartment provided with the isolated vapor space to maintain the acid concentration of the slurry at a level where substantially all of the iron present in the slurry will precipitate as insoluble iron oxide ($Fe_2O_3$). Conduit means are provided for removing from this compartment any gaseous product formed by the reaction of the neutralizing agent with the slurry while avoiding contamination of the vapor in the remaining compartments of the autoclave with the gaseous product.

A water-cooled condenser is also provided which is used to maintain the temperature within the vessel at a predetermined level. This condenser permits the removal of heat and water vapor from the autoclave without loss of valuable oxygen from the system.

These and other aspects of my invention will be understood more thoroughly in the light of the following description, as illustrated by the accompanying drawing.

BRIEF DESCRIPTION OF THE DRAWING

The drawing is a schematic representation of the autoclave used in my invention and also serves as a flow sheet of the system according to the invention.

DETAILED DESCRIPTION

A horizontal, cylindrically-shaped pressure vessel or autoclave, generally designated 10, is fitted internally with five upstanding lower baffles 12, the upper edges of which extend avove the predetermined normal liquid level maintained in said autoclave. The baffles 12 form six compartments 10A, 10B, 10C, 10D, 10E and 10F within the autoclave. An agitator 14, driven by a motor, not shown, is placed in the lower portion of each compartment and below the normal liquid level thereof. A pair of upper baffles 16, 18 extend downwardly so that the lower edges thereof are submerged beneath the normal liquid level. An open-ended conduit 20 extends through baffles 16, 18 and connects the vapor space above the liquid level of compartments 10A, 10B, 10C with the vapor space above compartments 10E and 10F. The vapor space 22 above the liquid level of compartment 10D is isolated from the vapor space above each of the other compartments.

In the preferred embodiment of the invention the system is employed in the high temperature-high pressure oxidation-acid leaching of a chalcopyrite ($CuFeS_2$) concentrate.

A continuous feed of chalcopyrite slurry enters compartment 10A through conduit 24 and a continuous flow of an oxygen-containing gas is fed into the autoclave 10 through conduit 26. The slurry feed stream 24 may consist of water and concentrate, or dilute $H_2SO_4$ and concentrate, or recycle slurry streams and concentrate, depending on process considerations. If desired, the water, dilute $H_2SO_4$ or recycle slurry streams could be fed into the autoclave separately from the chalcopyrite concentrate. The oxygen content of the oxygen-containing gas may vary widely. Because of economic considerations, however, it is preferred that a technical grade oxygen-containing gas having more than 95% by volume $O_2$ be used.

The point of introduction of the oxygen-containing gas into the autoclave is not critical. It can be anywhere except in compartment 10D having the isolated vapor space. Preferably the oxygen-containing gas is introduced at one end of the autoclave. In some cases it may be desirable to have more than one point of injection of the oxygen-containing gas. For example, the oxygen-containing gas could be injected below the surface of the slurry in each compartment, except the compartment having the isolated vapor space. In such a case the injection of the gas could be used as the means for agitating the slurry and mechanical agitation could then be minimized or eliminated. Total pressure within the autoclave should be maintained between about 300 and 1000 psig, and preferably between about 400 and 600 psig. The quantity of oxygen supplied should be sufficient to react with and oxidize all of the copper and iron in the slurry fed to the autoclave.

The slurry is agitated by agitators 14 and this results in contact between the slurry and the oxygen atmosphere which than causes the chalcopyrite to be oxidized to $CuSO_4$ and $FeSO_4$ with the evolution of heat according to the following equation, which takes place in an acid medium:

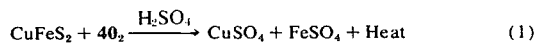

$$CuFeS_2 + 4O_2 \xrightarrow{H_2SO_4} CuSO_4 + FeSO_4 + \text{Heat} \quad (1)$$

Agitation of the slurry by either the agitators 14, or the introduction of oxygen, or both, together with the continuous feed of slurry into the autoclave through conduit 24 will cause the slurry to flow from compartment 10A over baffle 12 to compartment 10B, from compartment 10B over baffle 12 to compartment 10C. Flow of the slurry from compartment 10C to compartment 10D will be under the lower edge of baffle 16 and over the upper edge of baffle 12. Flow from compartment 10D to 10E will be over baffle 12 and under baffle 18, and flow will then continue from one compartment to the next over baffle 12.

As the slurry flows consecutively through compartments 10A, 10B and 10C reaction (1) continues as well as the following reactions which result in the precipitation of iron as hematite ($Fe_2O_3$) and the production of additional acid:

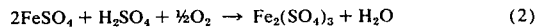

$$2FeSO_4 + H_2SO_4 + \tfrac{1}{2}O_2 \rightarrow Fe_2(SO_4)_3 + H_2O \quad (2)$$

and

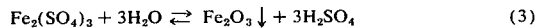

$$Fe_2(SO_4)_3 + 3H_2O \rightleftarrows Fe_2O_3 \downarrow + 3H_2SO_4 \quad (3)$$

As noted in equation (1), heat is generated in the autoclave. Therefore the heat in excess of that required to maintain the desired slurry temperature, which in these processes is normally between about 350° and 450°F, must be removed. This removal of heat is accomplished by removing a stream of vapor composed of water vapor, oxygen, and nitrogen through conduit 28. This stream enters condenser 30 where water vapor is condensed on the outside of tubes 32 by a cooling medium such as water which is circulated from a source, not shown, through the inside of the tubes. If desired, as for example, where corrosion is a factor, condenser 30 could be constructed to have the water vapor condense on the inside of the condenser tubes and the cooling medium circulate on the outside of the tubes. In either case, after removal of heat from the stream by condensation and removal of the water vapor, the residual oxygen, nitrogen and uncondensed water vapor are returned to the autoclave through conduit 34. The condensate discharged through conduit 36 is not returned directly to the autoclave since this water is removed from the system in order to increase the copper concentration in the slurry. It will be recognized that removal of heat by use of condenser 30 avoids the loss of oxygen from the system.

In a preferred embodiment it is desired to reduce the iron content of the final leach liquor to less than about 5 grams per liter. In order to accomplish this it is necessary that virtually all of the iron be precipitated as $Fe_2O_3$ (equation 3). However, as noted in equation (3), this reaction is reversible; therefore to insure the reaction proceeding to the right and obtaining the greatest amount of iron removal possible, it is necessary to remove some of the sulfuric acid, $H_2SO_4$, the presence of which tends to cause the reaction to stop or to proceed to the left.

To accomplish partial removal of the acid the slurry is treated by the introduction into compartment 10D through conduit 38 of a neutralizing agent. Neutralizing agents such as the oxides, hydroxides, or carbonates of sodium and potassium, or the oxides, hydroxides or carbonates of the alkaline earth metals calcium, strontium, barium and magnesium may be used. In addition, ammonia, ammonium hydroxide or ammonium carbonate may be used as the neutralizing agent. In my preferred embodiment I use calcium carbonate, i.e., limestone.

The limestone may be added as a dry powder or in the form of an aqueous slurry. The subsequent neutralization reaction proceeds as follows with the precipitation of $CaSO_4$ (anhydrite) and the evolution of gaseous $CO_2$:

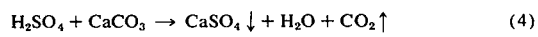

$$H_2SO_4 + CaCO_3 \rightarrow CaSO_4 \downarrow + H_2O + CO_2 \uparrow \quad (4)$$

The downwardly extending baffles 16, 18 which isolate the vapor space above the liquid level of compartment 10D from the vapor space above the liquid level in the remaining compartments prevent contamination or dilution of the oxygen-water vapor atmosphere with the evolved carbon dioxide and permit removal of this carbon dioxide through conduit 40 without any loss of oxygen since only water vapor accompanies the $CO_2$ as it is discharged through conduit 40. This loss of water vapor, however, is desirable since it contributes to further increase the concentration of copper in the leach liquor and to remove heat. The $CO_2$-water vapor bleed stream in conduit 40 may be vented to the atmosphere or processed for reclamation of heat.

The slurry next flows into compartments 10E and 10F, consecutively. While in these compartments the further final hydrolysis of $Fe_2(SO_4)_3$ and concomitant precipitation of $Fe_2O_3$ take place (equation 3). Also, since the vapor space above these compartments is connected to that above compartments 10A, 10B and 10C by conduit 20, the vapor space above compartments 10E and 10F has an atmosphere containing oxygen for oxidizing any material not oxidized in earlier compartments. Two streams may be taken from compartment 10F. A purge stream may be vented to the atmosphere through conduit 42 principally to prevent a buildup of nitrogen gas which may accompany the feed of oxygen into the autoclave through conduit 26. A small quantity of oxygen may be removed during this purging of nitrogen gas. In addition water vapor will be removed during the purging operation, further increasing the concentration of copper in the leach liquor. A product slurry stream made up of a leach liquor (composed principally of an acidic solution of $CuSO_4$) and a mixture of solids (principally $CaSO_4$, $Fe_2O_3$ and gangue) is removed through conduit 44.

The autoclave system of this invention may also be used to oxidize-leach nickel concentrates which may also contain cobalt, or concentrates which contain cobalt, nickel and copper. The process conditions may be somewhat different, but the system can still be employed. The design features of the autoclave are such that operating temperatures as high as about 500°F, operating pressures as high as about 1000 psig, and an acidic environment can be withstood. The autoclave system of this invention requires a plurality of compartments. The purpose of these compartments is to allow sufficient time for the oxygen-containing gas and the slurry to react so that substantially all of the nonferrous metal in the slurry is solubilized to the sulfate condition and the sulfur in the ore in excess of that necessary to form these sulfates reacts to form sulfuric acid. The number and size of compartments will depend on such process considerations as retention time, composition of ore feed, acidity of leach liquor, etc. In general, enough compartments should be provided to assure substantially complete reaction of the oxygen with the slurry. Preferably three or more compartments are used.

The position in the system of the compartment having the isolated vapor space will depend on various considerations. In general, this compartment may be placed anywhere in the system. Where chalcopyrite concentrates are treated, this compartment is preferably towards the end of the system, but usually is not the last compartment. The isolated vapor space could, if desired, extend over more than one slurry compartment of the autoclave. In such instances conduit 20 would then bypass more than one compartment. A plurality of isolated vapor spaces could be used if desired. Such would be the case if the leach liquor fed to the autoclave were a fairly strong recycle solution and process considerations required two or more neutralizations during processing in order to reduce the acidity of the slurry to a level where iron in the slurry will precipitate out as insoluble iron oxide.

It is not necessary that all of conduit 20 be located inside compartment 10D, as indicated in the figure, or even inside the autoclave. The greater part of conduit 20 could, for example, be located outside the autoclave compartments as long as its inlet and outlet connect the compartments adjacent to the compartment having the isolated vapor space. Also, it is not always necessary that conduits 40 and 42 have a common outlet as shown in the drawing. They could, if preferred, be two separate conduits discharging at two different locations, provided the individual exiting pressures are reasonably balanced to maintain the slurry at a normal level.

Should low-cost lime be available for neutralizing, or if a neutralizing agent is used that does not produce a gaseous reaction product while lowering the acid level of the slurry, conduits 40 and 42 should have a common outlet so that, through conduit 40, the pressure in compartment 10D is maintained substantially equal to the pressure in the rest of the system via conduit 42.

The position in the system of condenser 30 is not critical. At least a portion of the water vapor which makes up the stream flowing through conduit 28 should be condensed. Uncondensed water vapor and other gases (principally oxygen and nitrogen) are returned to the autoclave through conduit 34 to use their oxygen content. A blower 46 may be positioned between condenser 30 and the autoclave. The heat transferred to the cooling water of the condenser 30 may, optionally, be recovered in the form of low-pressure steam. In some instances the water removing-heat removing condenser of this invention may be used to handle the vapors from more than one autoclave or more than one autoclave system. For example, in a large commercial operation it may be desirable to operate with several autoclave systems in parallel. In such case only one condenser of the type described may be used to handle the vapors of the several autoclave systems with several lines corresponding to conduit 34 being individually controlled for returning oxygen to the systems.

EXAMPLE

The operation of the autoclave system of this invention may be illustrated by the following example:

A copper concentrate containing chalcopyrite ($CuFeS_2$) is fed to the autoclave system of the figure in an amount sufficient to provide about 289 tons of reacted $CuFeS_2$. This results in the dissolution of about 100 tons of Cu in the autoclave system. The concentrate, and 2,000 tons of water at about 80°F, are fed to the system as a slurry through conduit 24. This slurry flows consecutively, over the baffles 12, through compartments 10A through 10F. The temperature and pressure in the autoclave 10 are maintained at 425°F and 445 psig, respectively. Initially sufficient oxygen is supplied to react with the contents of the autoclave and result in an oxygen partial pressure within the autoclave of about 104 pounds per square inch. Thereafter, for each 100 tons of dissolved copper, commercial grade oxygen (about 99% $O_2$) is fed through conduit 26 in the amount of 222 tons of $O_2$ and 2 tons of $N_2$. Limestone in the form of a water slurry at 80°F is fed through conduit 38 in the amount of 140 tons of $CaCO_3$. Slurry water fed through conduit 38 amounts to 140 tons.

Gases from the space above the compartments 10A, 10B, 10C, 10E, and 10F are removed through conduit 28 and conduit 42, and gases from compartment 10D are removed through conduit 40. The gases removed through conduit 42 amount of 8 tons of $O_2$, 2 tons of $N_2$ and 14 tons of water vapor; those removed through conduit 28 amount to 1,800 tons of $O_2$, 450 tons of $N_2$ and 3,160 tons of water vapor; and those removed through conduit 40 amount to 60 tons of $CO_2$ and 60 tons of water vapor. About 316 tons of water vapor are condensed and removed through conduit 36 in water-cooled condenser 30. About 6,350 tons of cooling water flow through condenser tubes 32 in this operation. Inlet water temperature is 90°F and outlet water temperature is 150°F. About 1,800 tons of $O_2$ and 450 tons of $N_2$ together with 2,844 tons of uncondensed water vapor return to the system through conduit 34. A blower 46 is used for moving these gases, as indicated in the figure.

From the autoclave system of the figure the oxidized product slurry is removed through conduit 44 and indirectly cooled to 320°F in an indirect heat exchanger (not shown), and then flashed to atmospheric pressure and 230°F. The flashing operation removes 190 tons of water out of the 1750 tons leaving the autoclave with the slurry.

The heat balance for this example is summarized below, in millions of BTU (Reference Temperature: 32°F):

| | |
|---|---|
| Input streams (solids, gases and water) | +220MM BTU |
| Heat of Reaction (289 tons of $CuFeS_2$) | +2250 |
| Heat removed by condenser | −760 |
| Heat removed through conduits 40 and 42 | −180 |
| Heat removed by indirect slurry cooler (not shown) | −420 |
| Heat removed by flashing (not shown) | −440 |
| Heat in Exiting Slurry at 230°F | +67 MM BTU |

While the above example utilizes $CaCO_3$ as the neutralizing agent, it will be understood by those skilled in the art that an equivalent amount of any of the following neutralizing agents may be used in place of the $CaCO_3$ and that any gaseous reaction product resulting from the reaction thereof with the slurry may be removed through conduit 40: ammonia, ammonium hydroxide, ammonium carbonate and the oxides, hydroxides and carbonates of sodium and potassium and of the alkaline earth metals, calcium, strontium, barium and magnesium.

While the invention has been described in its preferred form as including apparatus and process steps relating to the removal, by the introduction of a neutralizing agent, of some of the sulfuric acid formed in the oxidation-leaching operation, it will be understood that this neutralizing step, and the apparatus for accomplishing it, may be omitted, and the oxidation-leaching operation may be performed utilizing the described temperature control aspects of the invention without also performing the neutralizing step.

The terms and expressions which have been used here are used as terms of description and not of limitation, and there is no intention, in the use of such terms and expressions, of excluding equivalents of the features shown and described, or portions thereof, it being recognized that various modifications are possible within the scope of the invention claimed.

I claim:

1. Apparatus for the leaching of ores comprising:
   a horizontally disposed autoclave having means for establishing a predetermined normal liquid level and a vapor space above the liquid level in said autoclave,
   means for supplying a slurry of ore into said autoclave,
   upstanding baffle means within said autoclave, disposed along the horizontal length of said autoclave and dividing said autoclave into at least three compartments, which include an upstream compartment, a downstream compartment, and a compartment intermediate said upstream and downstream compartments,
   said baffle means further comprising upper edges above the predetermined normal liquid level in said autoclave which allow overflow movement of said slurry between said compartments during operation of said autoclave,
   means isolating the vapor space above said intermediate compartment from the vapor space above said upstream and downstream compartments,
   means interconnecting the vapor space above said upstream and downstream compartments whereby vapor can move freely between said upstream and downstream compartments but cannot enter said isolated vapor space above said intermediate compartment,
   means for supplying an oxygen-containing gas into said autoclave other than in said isolated vapor space,
   means for agitating and intermixing said slurry with said oxygen-containing gas,
   means for maintaining the temperature of said slurry within said autoclave,
   means for maintaining the pressure of said oxygen-containing gas within said autoclave,
   means for introducing a neutralizing agent into said intermediate compartment so that gaseous reaction products of said neutralizing agent and said slurry are contained within said isolated vapor space above said intermediate compartment,
   means for removing said gaseous reaction products from said isolated vapor space while avoiding contamination of said oxygen-containing gas with said gaseous reaction products,
   means for purging nonreacted gases from said upstream and downstream compartments, and
   means for continuously withdrawing a stream of product slurry from said autoclave.

2. Apparatus as defined in claim 1 wherein said means for isolating said vapor space above said intermediate compartment comprises a pair of downwardly extending baffle means, about said intermediate compartment, the lower edges of which extend below the predetermined normal liquid level in said autoclave.

3. Apparatus as defined in claim 1 wherein the said means interconnecting the vapor space above said upstream and downstream compartments comprises an open-ended conduit which bypasses said isolated vapor space.

4. Apparatus as defined in claim 1 wherein the means for maintaining the temperature of said slurry within said autoclave comprise
   conduit means for withdrawing a stream of high temperature vapor from a vapor space of said autoclave other than said isolated vapor space,
   a condenser connected to said conduit means to condense at least a portion of said high temperature vapor,
   means for discharging the condensate to waste,
   and means for returning the uncondensed portion of said high temperature vapor to a vapor space of said autoclave other than said isolated vapor space.

5. Apparatus as defined in claim 1 wherein said autoclave contains more than three compartments.

6. Apparatus as defined in claim 1 wherein said autoclave contains at least one compartment disposed between said upstream and intermediate compartments.

7. Apparatus as defined in claim 1 wherein said autoclave contains at least one compartment, disposed between said upstream and intermediate compartments, having a vapor space above it that interconnects with the vapor spacae above said upstream compartment but is not interconnected with said isolated vapor space above said intermediate compartment.

8. Apparatus of claim 2 wherein said means for agitating and intermixing said slurry with said oxygen-containing gas comprises an agitator in each compartment below the predetermined normal liquid level in said autoclave.

9. Apparatus of claim 8 wherein said autoclave is cylindrically shaped.

* * * * *